2,839,866

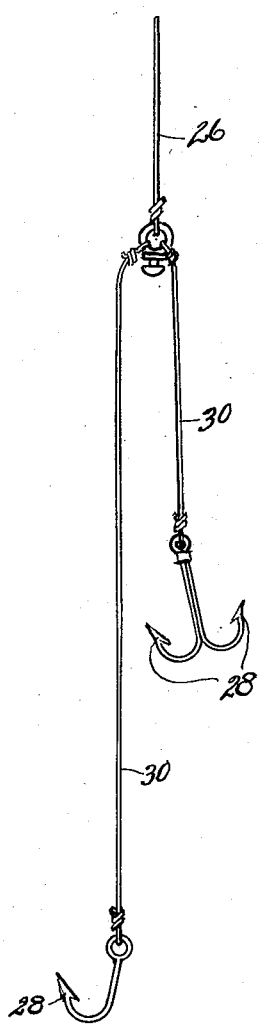
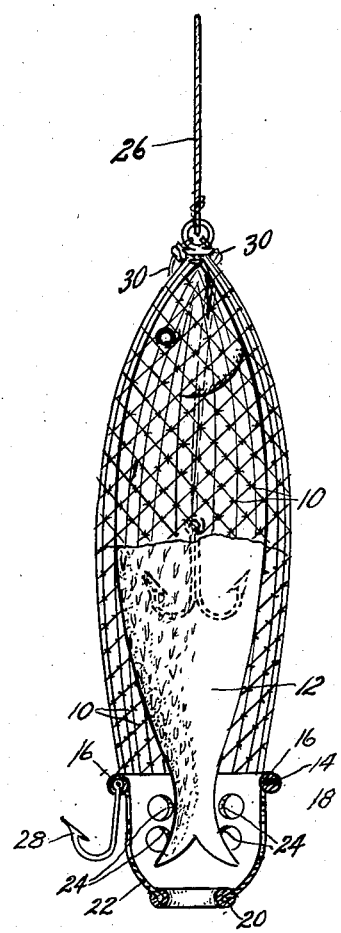
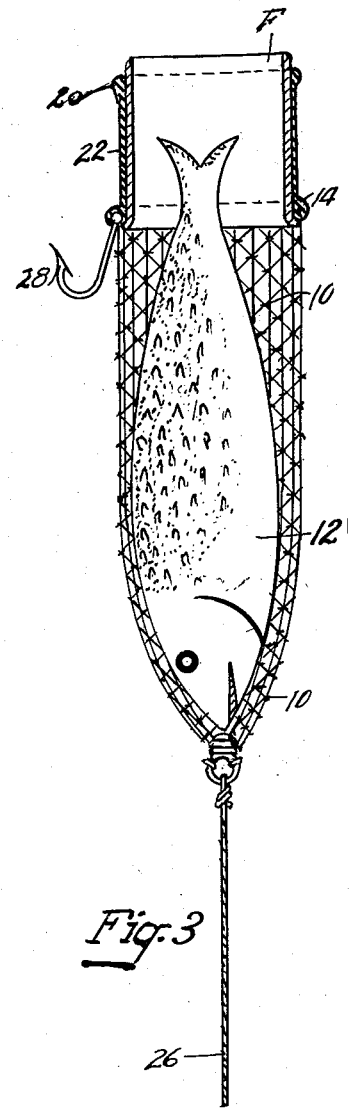
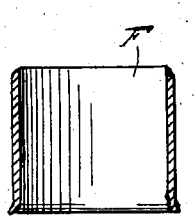
Fig. 1.
Fig. 2.
Fig. 3.
Fig. 4.
INVENTOR,
James E. Jay,
BY Hamilton & Hamilton,
Attorneys.

FISHING LURE

James E. Jay, Merriam, Kans.

Application February 1, 1956, Serial No. 562,824

2 Claims. (Cl. 43—41)

This invention relates to improvements in fishing lure and has for its principal object the provision of a fish lure having a container suitable for housing a live bait such as a minnow that may be used for a long period of time.

This fish lure comprises an open mesh bag closed at its front end and partly closed at its rear end by a retractable closure member adapted to normally partly close said container and adapted to be stretched over a funnel F, through which a minnow may be passed to a position in said live bait container and secured therein by removing said funnel from said retractable closure, to permit it to take its natural position for partly closing said bag. Reference will now be had to several views in the drawing wherein:

Fig. 1 is an elevational view of the fish lure with a minnow shown secured therein and with the container partly broken away.

Fig. 2 is a detached elevational view of the fish hooks with their attachment to the main fishing line.

Fig. 3 is an elevational view of the container with the closure means stretched over a funnel to receive a live minnow therein as shown so that when said minnow is so positioned the funnel F may be withdrawn from said closure member whereby it will be permitted to take its normal shape to secure the minnow in said container.

Fig. 4 is a sectional view of the symmetrical funnel F used to hold the lure in proper position for inserting the minnow therein.

Throughout the several views, like numerals designate similar parts and the numeral 10 designates mesh bag suitable for containing a live bait such as a minnow 12. This mesh bag has a selvedge edge 14 which is molded in a rubber band 16 which is integral with a closure member 18 and has a restricted closure band 20 spaced apart from band 16 by a thin body section 22 having holes 24 formed therethrough. When this rubber closure member is in its retracted shape the closure band 20 will be sufficiently small to hold the fish's tail against accidental movement from the container. The closure member 18 is shown in normal shape and position in Fig. 1 and the shape it will take when the funnel F is removed therefrom when it is in its usual shape to hold the fish in position.

The closure member 18 is made of a very elastic rubber which may be readily stretched by hand to proper dimensions to permit a fish to be dropped therethrough for lodgment in said mesh bag when it will be secured when the closure member is released and permitted to return to its normal shape. When so operating this fish lure no funnel will be needed in its operation.

Said mesh bag is provided at its front end with a suitable fishing line 26, to which the fish hooks 28 are connected by suitable leaders 30.

What I claim as new and desire to protect by Letters Patent is:

1. A fishing lure comprising a mesh bag having a closed front end and an open rear end, a rubber closure member molded to the rear open end of said mesh bag, said closure member having an elastic closure ring spaced from the open end of said mesh bag and extendable to receive a minnow into said mesh bag and retractable to partly close said mesh bag.

2. A fishing lure comprising a mesh bag suitable for receiving a live bait, fish hooks fixed to said bag, a rubber closure member molded to the lower open end of said mesh bag, a restricted rubber ring formed on said closure member in spaced relation to said open end of said mesh bag which when expanded serves to admit live bait to said mesh bag and when normally contracted serves to restrict the opening to said bag.

References Cited in the file of this patent

UNITED STATES PATENTS

| | | |
|---|---|---|
| 856,867 | Hayward | June 11, 1907 |
| 1,278,146 | Henthorn | Sept. 10, 1918 |
| 2,225,089 | Vadnais | Dec. 17, 1940 |
| 2,254,949 | Messacar | Sept. 2, 1941 |
| 2,486,320 | Ost | Oct. 25, 1949 |
| 2,732,653 | McGee | Jan. 31, 1956 |
| 2,780,021 | Fagg | Feb. 5, 1957 |